United States Patent
Samuel et al.

(10) Patent No.: US 9,781,716 B2
(45) Date of Patent: Oct. 3, 2017

(54) HIGH PRIORITY SERVICE SENDING AND RECEIVING METHOD AND DEVICE IN DIRECT MODE

(75) Inventors: Chia Han Siong Samuel, Shenzhen (CN); Fan Yang, Shenzhen (CN); Yan Xu, Shenzhen (CN); Mingjun Chen, Shenzhen (CN); Jianliang Liu, Shenzhen (CN); Hong Du, Shenzhen (CN)

(73) Assignee: Hytera Communications Corp., Ltd., Shenzhen, Guangdong (CN)

( * ) Notice: Subject to any disclaimer, the term of this patent is extended or adjusted under 35 U.S.C. 154(b) by 149 days.

(21) Appl. No.: 14/238,760

(22) PCT Filed: Aug. 15, 2011

(86) PCT No.: PCT/CN2011/078404
§ 371 (c)(1),
(2), (4) Date: Feb. 13, 2014

(87) PCT Pub. No.: WO2013/023352
PCT Pub. Date: Feb. 21, 2013

(65) Prior Publication Data
US 2014/0192790 A1    Jul. 10, 2014

(51) Int. Cl.
*H04W 72/04* (2009.01)
*H04J 3/16* (2006.01)
(Continued)

(52) U.S. Cl.
CPC ....... *H04W 72/0446* (2013.01); *H04J 3/1694* (2013.01); *H04W 72/1247* (2013.01); *H04W 76/023* (2013.01); *H04W 84/08* (2013.01)

(58) Field of Classification Search
CPC ......... H04W 72/1242; H04W 72/1247; H04W 72/0446; H04W 72/1205; H04W 76/023;
(Continued)

(56) References Cited

U.S. PATENT DOCUMENTS 5,771,463 A * 6/1998 Lehmusto ............. H04W 84/08
455/509
5,781,860 A * 7/1998 Lopponen ............. H04W 36/06
455/11.1
(Continued)

FOREIGN PATENT DOCUMENTS

CN   1585528 A   2/2005
CN   1882123 A   12/2006
(Continued)

OTHER PUBLICATIONS

Extended European Search Report dated Mar. 17, 2015 from corresponding European Application No. 11871016.
(Continued)

*Primary Examiner* — Kwang B Yao
*Assistant Examiner* — Ricardo Castaneyra
(74) *Attorney, Agent, or Firm* — Wolf, Greenfield & Sacks, P.C.

(57) ABSTRACT

A high priority service sending method and device in a direct mode, and a high priority service receiving method and device in a direct mode. The receiving method includes: after sending a voice frame in a voice call sending state, a user terminal receiving and detecting a priority frame in another time slot with respect to the time slot occupied by the voice call; and if the priority frame is detected, then stopping the voice call and receiving a high priority service frame in the other time slot. Using the present invention can enable an interphone in a transmitting state in a direct mode to send or receive a high priority service as well.

10 Claims, 5 Drawing Sheets

(51) Int. Cl.
*H04W 72/12* (2009.01)
*H04W 84/08* (2009.01)
*H04W 76/02* (2009.01)

(58) Field of Classification Search
CPC . H04W 76/06; H04W 76/064; H04W 76/007; H04W 76/005; H04W 76/048; H04W 84/08; H04W 28/10; H04W 28/18; H04W 28/24; H04W 4/10; H04W 4/22; H04W 48/18; H04W 52/0216
See application file for complete search history.

(56) References Cited

U.S. PATENT DOCUMENTS

| | | | |
|---|---|---|---|
| 6,317,595 | B1 | 11/2001 | St. John et al. |
| 2005/0064854 | A1* | 3/2005 | Jang ................ H04M 3/42187 455/415 |
| 2007/0275662 | A1* | 11/2007 | Grushkevich ........ H04W 72/10 455/41.2 |
| 2008/0153459 | A1* | 6/2008 | Kansal ............... H04M 1/72547 455/412.1 |
| 2008/0291853 | A1 | 11/2008 | Wiatrowski et al. |

FOREIGN PATENT DOCUMENTS

| | | |
|---|---|---|
| CN | 101237626 A | 8/2008 |
| CN | 101601313 A | 12/2009 |
| WO | WO 2010126752 A1 | 11/2010 |

OTHER PUBLICATIONS

International Search Report dated May 24, 2012 from corresponding International Application No. PCT/CN2011/078404.

\* cited by examiner

HIGH PRIORITY SERVICE SENDING AND RECEIVING METHOD AND DEVICE IN DIRECT MODE

CROSS REFERENCE TO RELATED APPLICATION

The present application is the national phase of International Application No. PCT/2011/078404, filed on Aug. 15, 2011, which is incorporated herein by reference in its entirety.

FIELD

The present disclosure relates to the technical field of communication, and in particular to a method and a device for transmitting and receiving a high-priority service in direct mode.

BACKGROUND

Digital Mobile Radio (DMR) protocol is a new type of communication protocol adapted for digital trunking communication system, which adopts the two-timeslot TDMA (Time Divide Multi Address) structure. As shown in FIG. 1, each burst sequence includes two timeslots, where each timeslot is 30 ms and each burst sequence is 60 ms. The objective of this protocol is to realize two calls via two timeslots in 12.5 KHz bandwidth; thus the channel efficiency of 6.25 KHz bandwidth can be realized.

DMR protocol includes direct mode (i.e., transmitting without repeater) and repeating mode. In one operating mode of the direct mode, a radio in transmitting state may only use one timeslot to realize a call. The other operating mode is channel inversion mode. As shown in FIG. 2, in channel inversion mode, radio MS2 which is receiving in timeslot 1, may send back in timeslot 2 a reversing burst signaling to the radio MS1 which is in transmitting state. The reversing burst (designated by the slashed part in FIG. 2) is a relatively short frame, which cannot be used to transmit audio signal, and can only carry the status data to notify the radio in transmitting state of the current status of the radio in receiving state. In this case, the high-priority services, such as short message service or call service, cannot be received by the radio in transmitting state.

SUMMARY

In view of this, a method and a device for transmitting and receiving a high-priority service in direct mode are provided according to the embodiments of the disclosure, by which a user terminal in transmitting state may receive a high-priority service in direct mode.

The following technical solutions are provided according to embodiments of the present invention:

A method for transmitting a high-priority service in direct mode, including:

receiving, by a user terminal, an instruction of transmitting a high-priority service, from a user;

generating, according to the instruction, a priority frame and a high-priority service frame, wherein the priority frame is used by a receiving party to identify the high-priority service; and transmitting the priority frame and the high-priority service frame.

A method for receiving a high-priority service in direct mode, including:

receiving and detecting a priority frame in another timeslot different from a timeslot occupied by a voice call, after a user terminal in the state of transmitting the voice call sends a voice frame;

stopping the voice call and receiving a high-priority service frame in the another timeslot if the priority frame is detected.

A device for transmitting a high-priority service in direct mode, including:

an instruction unit, adapted to receive from a user an instruction of transmitting the high-priority service;

a frame generation unit, adapted to generate a priority frame and a high-priority service frame according to the instruction, wherein the priority frame is used by a receiving party to identify the high-priority service; and a transmitting unit, adapted to transmitting the priority frame and the high-priority service frame A device for receiving a high-priority service in direct mode, including:

a transmitting unit, adapted to transmit a voice call;

a receiving and detecting unit, adapted to receive and detect a priority frame in another timeslot different from a timeslot occupied by the voice call after the transmitting unit transmits a voice frame;

a controlling unit, adapted to notify the transmitting unit to stop the voice call after the receiving and detecting unit detects the priority frame and notify the receiving unit to receive a high-priority service frame in the another timeslot; and the receiving unit, adapted to receive the high-priority service frame in the another timeslot.

According to the method and device for transmitting a high-priority service in direct mode provided according to an embodiment of the disclosure, in order that a receiving party of a high-priority service may identify the high-priority service, before transmitting a high-priority service frame, the user terminal may send a priority frame first; thus the receiving party may identify the high-priority service by detecting the priority frame and ensure to receive and process the high-priority service preferentially, regardless of whether the receiving party is in the state of receiving a voice call, monitoring the channel or transmitting a voice call. Correspondingly, according to the method for receiving a high-priority service in direct mode provided according to an embodiment, a user terminal which is in a state of transmitting a voice call may monitor another non-transmitting timeslot. Once a priority frame is detected by the user terminal in the another timeslot, the user terminal may stop the voice call and receive the high-priority service in a corresponding timeslot; thus the user terminal may access the high-priority service preferentially. In the embodiment, the user terminal may spend a little time (not more than 10 ms) to detect and identify a priority frame, which may not interrupt the transmitted voice call. Once the priority frame is detected, the transmitted voice call may be interrupted immediately; thus the user terminal participated in the voice call may receive the high-priority short message or high-priority call. By the priority frame, the user terminal in transmitting state may switch to receiving state for a short time without interrupting the transmitting; thus a seamless switching between the transmitting state and the state of receiving the high-priority service may be realized.

DETAILED DESCRIPTION

The technical solutions according to the embodiments of the present application will be described in more details with reference to the attached drawings, to make the solutions better understood by those skilled in the art.

In order to help understand the disclosure, a generic data frame format defined in the existing DMR protocol is briefly described below.

Figure 1:
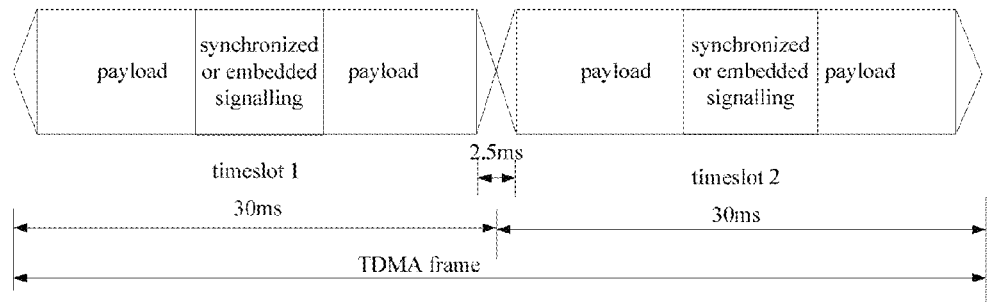
FIG. 1 is a schematic diagram of the TDMA frame structure for a mobile station as defined in the existing DMR protocol.
Figure 2:
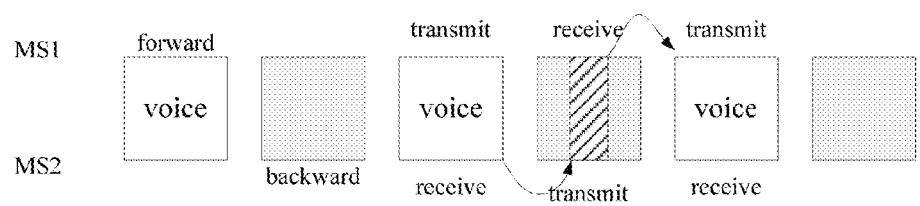
FIG. 2 is a schematic diagram of channel inversion in the direct mode as defined in the existing DMR protocol.
Figure 3:
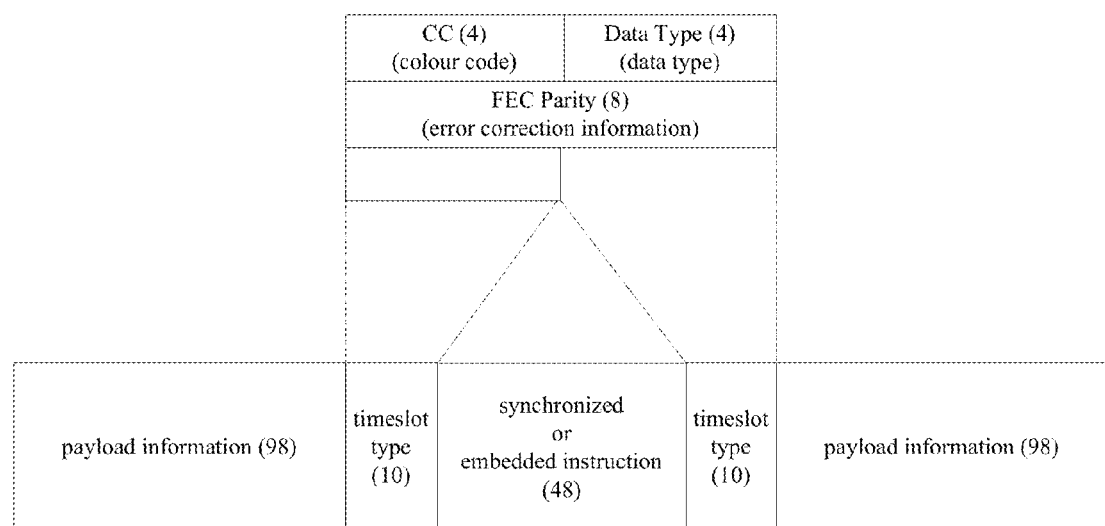
FIG. 3 is a schematic diagram of a generic data frame format defined in the existing DMR standard.

As shown in FIG. 3, the field of data type in timeslot type PDU (Protocol Data Unit) indicates either the type of the data carried by the generic data frame or the type of the control frame, and the 196 bits arranged on the two sides the data type field is the payload and related error correction information carried by the frame of the data type. The data type is defined as listed in Table 1.

TABLE 1

| Information unit | Length | Value | Note |
| --- | --- | --- | --- |
| Data type | 4 | 0000 | PI (Privacy Indicator) header |
| | | 0001 | Voice LC (Link Control) header |
| | | 0010 | Voice LC (Terminator with Link Control) |
| | | 0011 | CSBK (Control Signaling Block) |
| | | 0100 | MBC (Multi Block Control) header |
| | | 0101 | MBC connection block |
| | | 0110 | data header |
| | | 0111 | data block at rate of ½ |
| | | 1000 | data block at rate of ¾ |
| | | 1001 | free |
| | | 1010 | data block at rate of 1 |
| | | 1011 | reserved |
| | | 1100 | reserved |
| | | 1101 | reserved |
| | | 1110 | reserved |
| | | 1111 | reserved |

In order that a transmitting user terminal in direct mode may also receive a high-priority service, where the high-priority service refers to urgent service such as an urgent text message or a urgent voice call service, etc., in the method for transmitting a high-priority service in direct mode provided according to an embodiment of the disclosure, a user terminal in the state of receiving a voice call may transmit the high-priority service in another idle timeslot. In order to distinguish ordinary services and high-priority services, a service frame of the high-priority service may be called as a high-priority service frame. Moreover, in order that a receiving party of the high-priority service may identify the high-priority service, a priority frame is transmitted before the transmission of the high-priority service frame. Correspondingly, in the method for receiving a high-priority service in direct mode according to the embodiments, a user terminal in the state of transmitting a voice call may monitor another non-transmitting timeslot; once a priority frame is detected in the another timeslot, the voice call may be stopped, and the high-priority service may be received in the corresponding timeslot; thus the user terminal may access the high-priority service preferentially.

The priority frame may be in the data frame format defined in the DMR standard, and different priority frames are distinguished by adding new data type to the existing data frame format. However, the embodiments of the present invention may not only be limited to the data frame format defined in the DMR standard, but also be applied to the communication environments supporting TDMA, where only the data frame formats are more or less different.

There may be one or more (including two or more than two) priority frames, and the disclosure is not limited in this aspect. In view of the accuracy and expense of the detecting, in practical application, it is preferable to adopt two priority frames. For convenience, the two priority frames may be referred respectively as the first priority frame PB1 and the second priority frame PB2, where the two priority frames may be the same or not.

The priority frame PB1 and PB2 may be defined by the reserved value for the field of data type defined in the DMR protocol, and the data type of the two priority frames PB1 and PB2 are defined as in Table 2.

TABLE 2

| Information unit | Length | Value | Note |
| --- | --- | --- | --- |
| Data type | 4 | 1110 | priority burst 1 |
| | | 1111 | priority burst 2 |

The PDU structure of the priority frame may be defined arbitrarily, or may be in the PDU structure similar to CSBK. The structure is shown in FIG. 4.

Figure 4:
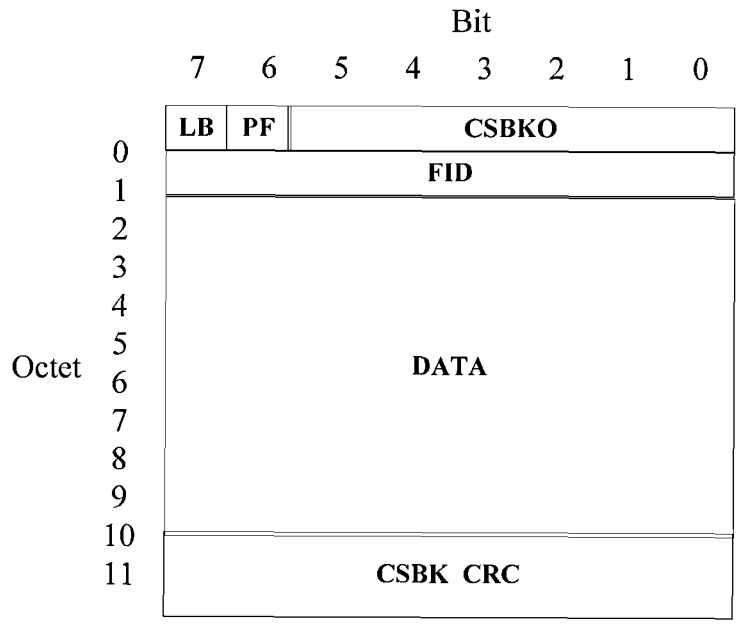
FIG. 4 is a schematic structure diagram of a Protocol data unit (PDU) of a priority frame according to an embodiment of the disclosure.

The definition of each block in FIG. 4 includes:

The label LB represents the last block;

The label PF represents a protect flag;

The label CSBKO represents a control signaling block opcode;

The label FID represents a feature set ID;

The label DATA represents data information, which may include a source address, a target address, etc.;

The label CSBK CRC represents a control signaling block cyclic redundancy checksum; and The second to the ninth bits for Octet and the 6 bits for CSBKO may be designed by the user as needed.

It should be noted that, if there is no activity in a channel, the way and process of transmitting the high-priority service by the user terminal may be the same as the existing way and process of transmitting an ordinary call by the user terminal.

But if there is already a voice call in the channel, according to the method for transmitting a high-priority service in direct mode provided according to an embodiment of the disclosure, the high-priority service may be transmitted in another idle timeslot other than the receiving timeslot.

Figure 5:
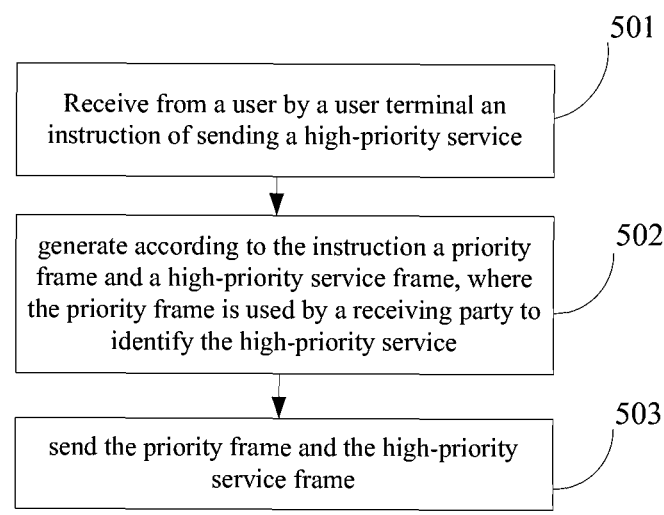
FIG. 5 is a flowchart of a method for transmitting a high-priority service in direct mode according to an embodiment of the disclosure.

As shown in FIG. 5, a process of the method for transmitting a high-priority service in direct mode provided according to an embodiment of the disclosure, includes:

Step 501: receiving, by a user terminal, an instruction of transmitting a high-priority service, from a user;

Step 502: generating, according to the instruction, a priority frame and a high-priority service frame, where the priority frame is used by a receiving party to identify the high-priority service; and Step 503: transmitting the priority frame and the high-priority service frame.

The priority frame may be in the data frame format defined in the DMR standard, and a frame may be indicated as a priority frame by adding new data type based on the existing data frame format or by using the reserved value for the existing data type. If there are multiple priority frames, the multiple priority frames may be distinguished by different data type values.

The high-priority service frame may be in the generic data frame format defined in the existing DMR standard.

It should be noted that, while transmitting the priority frame and the high-priority service frame, the user terminal may be in the state of receiving a voice call or in the idle state. If the user terminal is in a state of receiving a voice call, it is needed to stop receiving the voice call first and then send the priority frame and the high-priority service frame in another idle timeslot; if the user terminal is in the idle state, the priority frame and the high-priority service frame may be sent in any timeslot, such as transmitting the priority frame and the high-priority service frame in the first timeslot by default.

In this embodiment, the high-priority service may be a service of voice call, a service of text message service (e.g., short message service, multimedia message service), etc.

Moreover, in practical application, if the high-priority service is transmitted to a single user, the receiving party may be required to acknowledge the receiving of the service; if the high-priority service is transmitted to multiple users, the receiving parties may not be required to acknowledge the receiving of the service. The receiving party may determine whether to send back a response frame according to the type of the received call. Therefore, if the high-priority service is required to be acknowledged by the receiving party, for example, a high-priority short message required to be acknowledged is transmitted, the user terminal may switch to the receiving state after the transmitting of the high-priority service frame is completed and start a response waiting timer to wait for the response frame transmitted from the receiving party. If the user terminal receives the response frame in the idle timeslot within a preset time period (the time period set by the timer), the user terminal may display a prompt message, such as "short message is transmitted successfully", which indicates that the service is transmitted successfully; thus the user of the user terminal may learn whether the short message is transmitted to the receiving party successfully.

In addition, for the high-priority short message service, after the transmitting of the high-priority service frame is completed, the user terminal may display a prompt message which indicates that the transmitting of the service is successful.

In practical application, in order that the user terminal may identify whether a service sent from the user is an ordinary service or a high-priority service, an edit menu or a selection panel may be provided for the user, and the user terminal may determine whether the service to be transmitted is a high-priority service according to the user's choice. If the service to be transmitted is a high-priority service, the user terminal may generate and transmit the priority frame; otherwise, the user terminal may not generate and transmit the priority frame.

In certain application scenarios, for example, the users in a cluster may have different levels of authority, where a user in high authority may interrupt a call of a user in low authority. In view of this, in this embodiment, a service level indicator may be further carried in the priority frame so that the receiving party may determine whether to interrupt the current call according to the detected service level indicator. The service level indicator may be implemented by the field of data type in the PDU structure of the priority frame or may be implemented in other ways, and the disclosure is not limited in this aspect.

It should be noted that, in this embodiment, the user terminal may be any terminal device with radio function, such as portable radio and vehicle radio.

Thus it can be seen that, according to the method for transmitting a high-priority service in direct mode provided according to an embodiment, in order that a receiving party of a high-priority service may identify the high-priority service, a priority frame may be transmitted before a high-priority service frame is transmitted; thus the receiving party may detect correctly the priority frame and receive the high-priority service preferentially.

Correspondingly, a method for receiving a high-priority service in direct mode is further provided according to this embodiment, by which a call may be interrupted and a user terminal participating in the call may access a high-priority service preferentially.

Figure 6:
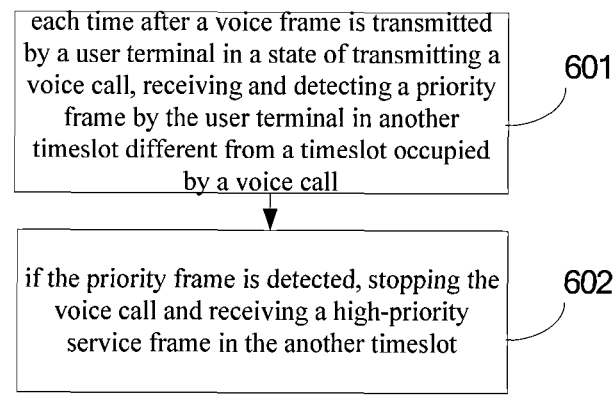
FIG. 6 is a flowchart of a method for receiving a high-priority service in direct mode according to an embodiment of the disclosure.

FIG. 6 is a flowchart of the method for receiving a high-priority service in direct mode provided according to an embodiment. The method includes:

Step 601: each time after a voice frame is transmitted by a user terminal in a state of transmitting a voice call, receiving and detecting a priority frame by the user terminal in another timeslot different from a timeslot occupied by a voice call;

Step 602: if the priority frame is detected, stopping the voice call and receiving a high-priority service frame in the another timeslot.

If the priority frame is not detected, the user terminal may continue the current voice call.

It should be noted that, in Step 601, the voice frame transmitted by the user terminal may be an ordinary service frame or a high-priority service frame.

If the voice frame is a high-priority service frame, after detecting the priority frame, the user terminal may keep on to detect the service level indicator in the priority frame. If the level of the high-priority service indicated by the service level indicator is higher than the level of the current voice call, the current voice call may be stopped; otherwise, the current voice call may not be stopped. In this embodiment, the high-priority service may be a voice call service, a text message service (e.g., short message service, multimedia message service), etc.

In addition, the embodiment may further include the following step:

after the user terminal completes the receiving of the high-priority service frame, displaying a prompt massage, which indicates that the high-priority service is completed.

In addition, if the high-priority service is required to be acknowledged by the receiving party, such as short message service, the method may further include:

after completing the receiving of the high-priority service frame, sending a response frame in the another timeslot by the user terminal.

Moreover, if the received high-priority service is a short message service, after completing the receiving of the high-priority service frames, the user terminal may display the received short message.

In practical application, in order to meet the user's application requirements in different environments, a high-priority service function may be enabled by configuration and may be activated when a user terminal in state of transmitting a voice call may receive the high-priority service preferentially.

It should be noted that, in this embodiment, the user terminal may be any terminal device with radio function, such as portable radio and vehicle radio.

Thus it can be seen that, according to the method for receiving a high-priority service in direct mode provided according to this embodiment, a user terminal which is in a state of transmitting a voice call may monitor another non-transmitting timeslot. Once a priority frame is detected by the user terminal in the another timeslot, the user terminal may stop the voice call and receive the high-priority service in the corresponding timeslot; thus the user terminal may access the high-priority service preferentially.

The specific applications of the method for receiving a high-priority service in direct mode according to the disclosure in different environments may be specified in the following examples.

Example 1: A User Terminal Participated in a Call Receives a High-Priority Short Message If a channel is occupied for a long time during a call and an administrator of the call group needs to send a short message to notify all the group members, including the group member who is transmitting the voice call, to execute an instruction in emergency, the function of transmitting a high-priority short message may be enabled for the user terminal to interrupt the voice call being transmitted; thus all the group members may receive the high-priority short message.

Suppose that there are two group members, user terminal A and user terminal C, together with user terminal B as an administrator in call group 1. The implementation process is described as follows:

1. User terminal A and user terminal C are enabled to receive a high-priority short message; user terminal B is enabled to transmit the high-priority short message.

2. User terminal A initiates a group call to call the group members of call group 1, and the user terminal B as the group administrator and user terminal C may join in the call.

3. The administrator user terminal B receives an instruction transmitted from a superior, and needs to send a short message of executing the instruction to user terminal A and user terminal C. The user of user terminal B edits the short message via a menu or a selection panel, and user terminal B may transmit a priority frame and the edited short message to user terminal A and user terminal C in another idle timeslot.

4. User terminal A detects the priority frame in the another non-transmitting timeslot. If the priority frame is detected, the user terminal A may stop transmitting the voice call and receive the short message which follows the priority frame.

User terminal C ceases the receiving of the call sent from user terminal A and begins to receive the high-priority short message sent from user terminal B.

It should be noted that, the user terminal, which does not need to transmit the high-priority service, may monitor two timeslots simultaneously in order to receive the higher priority service preferentially.

Example 2: A User Terminal Participated in a Call Receives a High-Priority Call

If a channel is occupied for a long time during a call and a group administrator needs to interrupt the user who is transmitting a voice call and makes himself/herself heard by all the group members, the user terminal of the administrator may be enabled to send a high-priority call to interrupt the voice call being transmitted; thus all the group members may receive a new call.

Suppose that there are two group members, user terminal A and user terminal C, together with user terminal B as an administrator in call group 1. The implementation process is described as follows:

1. User terminal A and user terminal C are enabled to receive a high-priority call; user terminal B is enabled to transmit the high-priority call.

2. User terminal A initiates a group call to call the group members of call group 1, and user terminal B as the group administrator and user terminal C may join in the call.

3. If the group administrator wants to interrupt the voice call of user terminal A and make a speech, the user of user terminal B may press the PTT (Push-to-Talk) button on user terminal B and send a group call to the group members of call group 1 in another idle timeslot. Before transmitting the voice frame for this group call initiated by user terminal B, user terminal B needs to send a priority frame first.

4. User terminal A detects the priority frame in the another non-transmitting timeslot, stops transmitting the voice call, and receives in the non-transmitting timeslot the group call initiated by user terminal B.

User terminal C ceases the receiving of the call sent from user terminal A and begins to receive the high-priority group call initiated by user terminal B.

It should be noted that, the user terminal, which does not need to send the high-priority service, may monitor two timeslots simultaneously in order to receive the higher priority service preferentially.

Example 3: A User Terminal in Receiving State Accesses a High-Priority Short Message Preferentially If there are two calls in a channel, including an ordinary voice call and a high-priority short message, the user terminal in receiving state may monitor the two calls and access the high-priority short message preferentially.

Suppose that there are two group members, user terminal A and user terminal C, together with user terminal B as an administrator in call group 1. The implementation process is described as follows:

1. User terminal C is enabled to receive a high-priority short message; user terminal B is enabled to send the high-priority short message.

2. User terminal A initiates a group call, and the group administrator user terminal B and user terminal C may join in the call.

3. The user of user terminal B edits the short message via a menu or a selection panel, and user terminal B may transmit a priority frame and the edited short message to user terminal C in another idle timeslot.

4. User terminal C stops receiving the call sent from user terminal A and begins to receive the high-priority short message sent from user terminal B.

It should be noted that, in this embodiment, user terminal C needs to monitor two timeslots simultaneously. For example, if user terminal C receives a voice call in timeslot 1, then detects a high-priority service in timeslot 2, then user terminal C may cease the voice call in timeslot 1 and begin to receive the high-priority service in timeslot 2.

User A may keep on transmitting the voice call until the user of user terminal A releases the PTT button.

It should be noted that, the user terminal may be a portable terminal device, or other similar communication devices such as vehicle radio.

Figure 7:
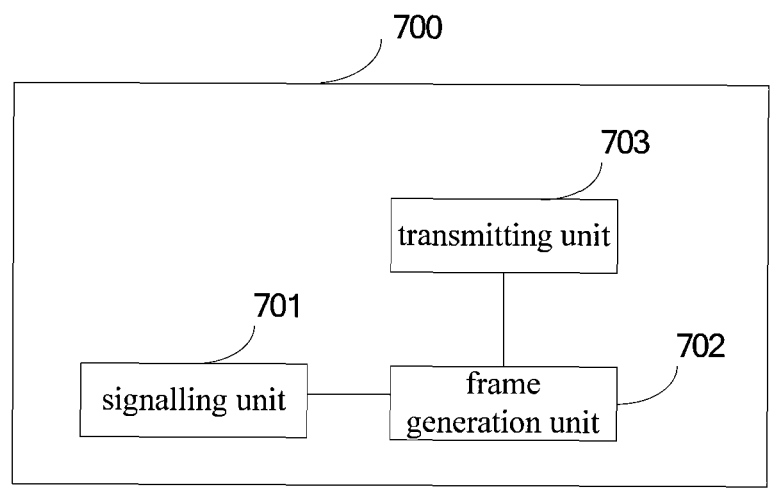
FIG. 7 is a schematic structure diagram of a device for transmitting a high-priority service in direct mode according to an embodiment of the disclosure.

Correspondingly, a device for transmitting a high-priority service in direct mode is provided according to an embodiment of the disclosure. FIG. 7 is a structural schematic diagram of the device.

In this embodiment, the transmitting device 700 includes:

an instruction unit 701 adapted to receive from a user an instruction of transmitting the high-priority service;

a frame generation unit 702 adapted to generate a priority frame and a high-priority service frame according to the instruction, where the priority frame is used by a receiving party to identify the high-priority service; and a transmitting unit 703 adapted to transmit the priority frame and the high-priority service frame.

It should be noted that, while transmitting the priority frame and the high-priority service frame, the transmitting device may be in the state of receiving a voice call or idle.

Figure 8:
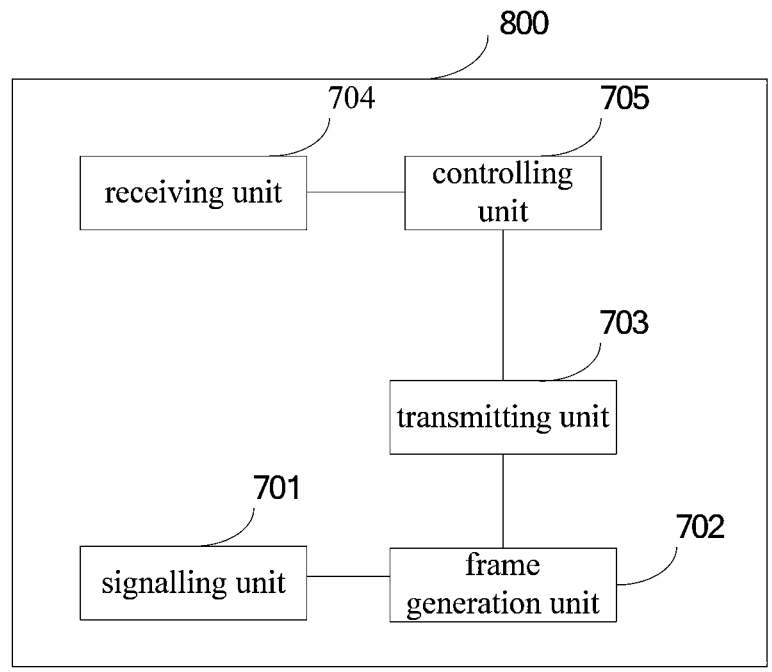
FIG. 8 is another schematic structure diagram of a device for transmitting a high-priority service in direct mode according to an embodiment of the disclosure.

In view of this, in another embodiment, as shown in FIG. 8, the transmitting device 800 may further include:

a receiving unit 704 adapted to receive a voice call; and a controlling unit 705 adapted to detect whether the transmitting device is in the state of receiving the voice call, and to control the receiving unit 704 to stop receiving the voice call and notify the transmitting unit 703 to send the priority frame and the high-priority service frame in another idle timeslot other than a receiving timeslot in a case that the transmitting device is in the state of receiving the voice call.

Of course, if the controlling unit 705 detects that the transmitting device is idle, it may notify the transmitting unit 703 to transmit the priority frame and the high-priority service frame in any timeslot, such as transmitting the priority frame and the high-priority service frame in the first timeslot by default.

In the embodiments of the disclosure, the high-priority service refers to urgent service such as an urgent text message (e.g., short message, multimedia message) or an urgent voice call. The transmitting device may be varied according to different high-priority services and application environments.

Figure 9:
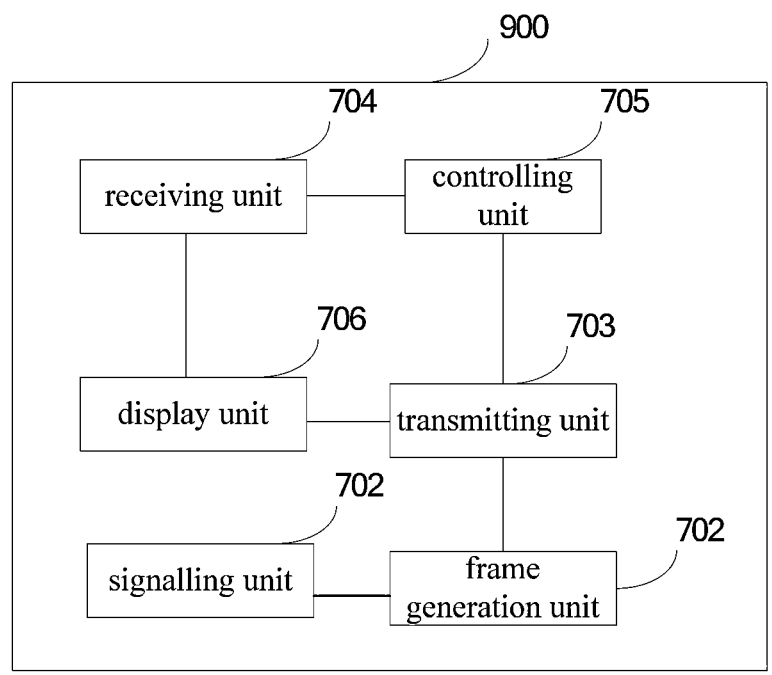
FIG. 9 is another schematic structure diagram of a device for transmitting a high-priority service in direct mode according to an embodiment of the disclosure.

FIG. 9 is another structural schematic diagram of the device for transmitting a high-priority service in direct mode provided according to an embodiment of the disclosure.

Different from the embodiment shown in FIG. 8, in this embodiment, the transmitting device 900 further includes:

a display unit 706 adapted to display a prompt message which indicates that the service is transmitted successfully in a case that a response frame is received within the idle timeslot by the receiving unit 704 in a preset period since the transmission of the high-priority service frame is completed by the transmitting unit 703.

For the high-priority service which needs to be acknowledged by the receiving party, the transmitting device in this embodiment may be adapted to receive a response frame and display a prompt message which indicates that the transmitting is successful after completing the transmitting of the high-priority service frame.

In addition, if the high-priority service is a short message service, after the transmitting unit 703 completes the transmitting of the high-priority service frame, the display unit 706 may display a prompt message which indicates that the transmitting is successful.

In practical application, in order that the transmitting device may identify whether the service transmitted from a user is an ordinary service or a high-priority service, an edit menu or a selection panel may be provided for the user, and the transmitting device may determine according to the user's choices whether the service to be transmitted is a high-priority service. If the service to be transmitted is a high-priority service, the transmitting device may generate and send the priority frame; otherwise, the transmitting device may not generate and send the priority frame. Moreover, before transmitting the high-priority service, the user terminal may check the channel first. If there is a voice call in the channel, the user terminal may send the high-priority service in another idle timeslot; if there is no voice call in the channel, i.e., the two timeslots are idle, the user terminal may send the high-priority service in the first timeslot by default.

Thus it can be seen that, according to the device for transmitting a high-priority service in direct mode provided by an embodiment of the disclosure, in order that a receiving party of a high-priority service may identify the high-priority service, the transmitting device may send a priority frame before transmitting the high-priority service frame; thus the receiving party may detect correctly the priority frame and receive the high-priority service preferentially.

Figure 10:
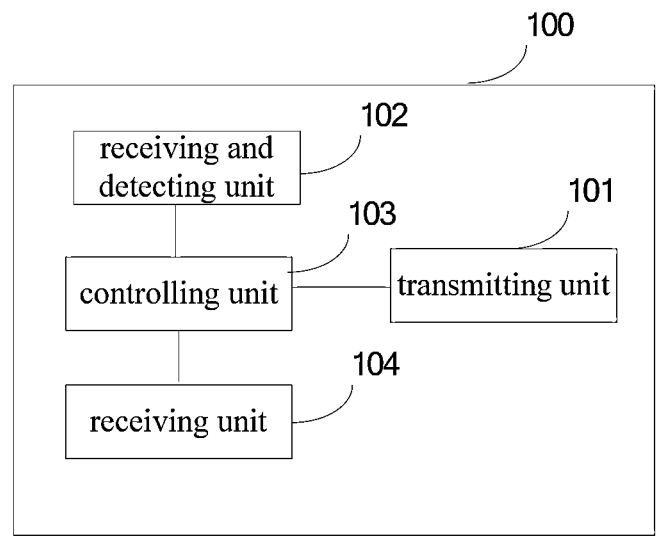
FIG. 10 is a schematic structure diagram of a device for receiving a high-priority service in direct mode according to an embodiment of the disclosure.

Correspondingly, a device for receiving a high-priority service in direct mode is provided according to an embodiment of the disclosure. FIG. 10 is a structural schematic diagram of the device for receiving a high-priority service in direct mode provided according to an embodiment of the disclosure.

In this embodiment, the receiving device 100 includes:

a transmitting unit 101 adapted to transmit a voice call;

a receiving and detecting unit 102 adapted to receive and detect a priority frame in another timeslot different from a timeslot occupied by the voice call each time the transmitting unit 901 transmits a voice frame;

a controlling unit 103 adapted to notify the transmitting unit 101 to stop the voice call after the receiving and detecting unit 102 detects the priority frame and notify the receiving unit to receive a high-priority service frame in the another timeslot; and a receiving unit 104 adapted to receive the high-priority service frame in the another timeslot.

It should be noted that, the voice frame currently transmitted by the transmitting unit 101 may be an ordinary service frame or a high-priority service frame. If the voice frame is a high-priority service frame, after detecting the priority frame, the receiving and detecting unit 102 may further adapted to detect whether the level of the high-priority service indicated by the service level indicator in the priority frame is higher than the level of the voice call. Correspondingly, the controlling unit 103 may further adapted to, in a case that the receiving and detecting unit 102 detects that the level of the high-priority service indicated by the service level indicator is higher than the level of the voice call, notify the transmitting unit 101 to stop the voice call and notify the receiving unit 104 to receive the high-priority service frame in the another timeslot.

In this embodiment, the high-priority service refers to urgent service such as an urgent text message or an urgent voice call. The receiving device may be varied according to different high-priority services and application environments.

Figure 11:
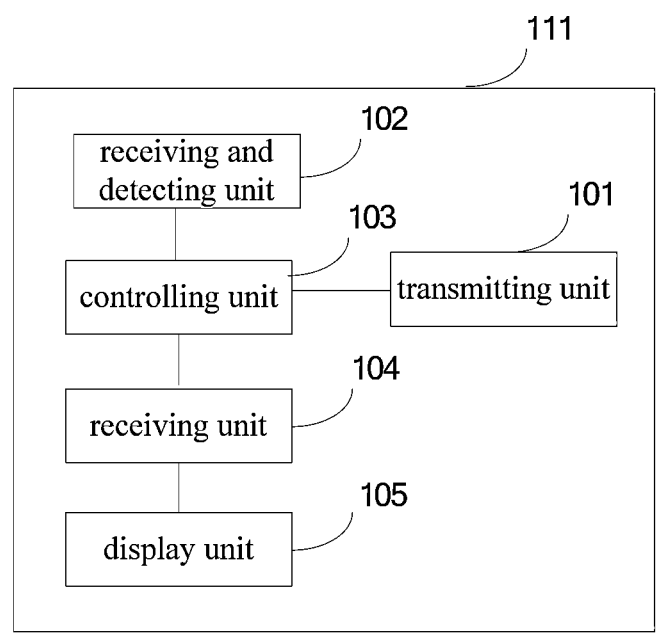
FIG. 11 is another schematic structure diagram of a device for receiving a high-priority service in direct mode according to an embodiment of the disclosure.

FIG. 11 is another structural schematic diagram of the device for receiving a high-priority service in direct mode provided according to an embodiment of the disclosure.

Different from the embodiment shown in FIG. 10, in this embodiment, the receiving device 111 further includes:

a display unit 105 adapted to display, after the receiving unit 104 completes the receiving of the high-priority service frame, a prompt message which indicates that the receiving of the high-priority service frame is completed.

In addition, if the high-priority service is a short message service, the display unit 105 may display the received short message after the receiving unit 104 completes the receiving of the high-priority service frame.

It should be noted that, the receiving device shown in FIG. 10 and FIG. 11, may further be adapted for the high-priority service which needs to be acknowledged by the receiving party, in which the transmitting unit 101 may send back a response frame to the transmitting party after the receiving unit 104 completes the receiving of the high-priority service frame, and the response frame may be transmitted in the same timeslot in which the high-priority service frame is received, i.e., the another timeslot mentioned above.

In practical application, in order to meet the user's application requirements in different environments, the device for receiving a high-priority service in direct mode may be enabled with a high-priority service function by configuration. If a user in the state of transmitting a voice call needs to receive a high-priority service preferentially, the user may activate the function.

Thus it can be seen that, according to the device for receiving a high-priority service in direct mode provided according to an embodiment of the disclosure, a user terminal, which is the state of transmitting a voice call, may monitor another non-transmitting timeslot. Once the user terminal detects a priority frame in the another non-transmitting timeslot, the user terminal may stop the voice call and receive a high-priority service in the corresponding timeslot; thus the user terminal may access the high-priority service preferentially.

It may be seen from the description of the embodiments that in the method and device provided according to the embodiments, the two timeslots in TDMA are made good use, by which a user terminal in receiving state may receive high-priority services in the same way as receiving ordinary services, and a user terminal in transmitting state may receive high-priority services preferentially in the another timeslot.

The same or similar parts of the embodiments in the specification may be referred to each other, and each embodiment highlights the difference from the other embodiments. In particular, the description of the device embodiment is simple because it is similar to the method embodiment and the method embodiment may be referred to for better understanding of the device embodiment. The device embodiment described above is only exemplary, in which the units described as separate components may be or not be separated physically, components shown as units may be or not be physical units, i.e., the components may be located at one place or distributed as multiple network units. Some or all of the modules may be selected to implement the objective of the solution of the embodiments as required. Moreover, the transmitting device and receiving device may be integrated in one physical device to provide the corresponding transmitting and receiving function. Those skilled in the art can understand and practice the disclosure without any creative works. In addition, the device in the embodiments may be a portable terminal device such as portable radio or other similar communication devices such as vehicle radio.

The disclosed embodiments are only the preferable implementations of the disclosure and the disclosure is not meant to be limited to these embodiments. Various modifications made without creative work, or the improvements or changes based on the spirit of the disclosure, fall into the protection scope of the disclosure.

The invention claimed is:

1. A method for receiving a high-priority service in direct mode, comprising:

receiving and detecting, by a caller terminal, a priority frame in a first timeslot different from a second timeslot occupied by a voice call, after the caller terminal sends a voice frame;

detecting a service level indicator in the priority frame after the priority frame is detected;

stopping the voice call if a level of the high-priority service indicated by the service level indicator is higher than a level of the voice call, wherein the high-priority service is a service needing to be acknowledged by the caller terminal;

receiving a high-priority service frame in the first timeslot; and transmitting a response frame in the first timeslot to a callee terminal after the receiving of the high-priority service frame is completed, to facilitate the callee terminal to display a prompt message which indicates that the service is transmitted successfully in a case that the response frame is received within the first timeslot by the callee terminal in a preset period since transmission of the high-priority service frame is completed by the callee terminal, wherein the priority frame and the high-priority service frame are generated and transmitted in the first timeslot from the callee terminal.

2. The method according to claim 1, wherein the method further comprises:

displaying, the prompt message which indicates that the high-priority service is completed.

3. The method according to claim 1, wherein
the high-priority service is a voice call service; or
the high-priority service is a short message service, and the method further comprises:

displaying, by the caller terminal, a received short message after the receiving of the high-priority service frame is completed.

4. The method according to claim 1, wherein the priority frame comprises a first priority frame and a second priority frame.

5. A device for transmitting a high-priority service in direct mode, applied to a terminal, comprising:

an instruction unit, configured to receive from a user an instruction of transmitting the high-priority service;

a frame generation unit, configured to generate a priority frame and a high-priority service frame according to the instruction, wherein the priority frame is used by a receiving party to identify the high-priority service;

a transmitting unit, configured to transmit the priority frame in an idle timeslot;

a controlling unit, configured to notify the transmitting unit to send the high-priority service frame in the idle timeslot, wherein the high-priority service is a service needing to be acknowledged by the receiving party; and a displaying unit, configured to display a prompt message which indicates that the service is transmitted successfully in a case that a response frame is received within the idle timeslot by a receiving unit in a preset period since the transmission of the high-priority service frame is completed by the transmitting unit.

6. The device according to claim 5, further comprises:

the receiving unit, configured to receive a voice call; and the controlling unit, configured to detect whether the device is in a state of receiving the voice call, and to control the receiving unit to stop receiving the voice call and notify the transmitting unit to send the priority frame and the high-priority service frame in the idle timeslot in a case that the device is in a state of receiving the voice call.

7. The device according to claim 6, wherein the high-priority service is a short message service, and the displaying unit is further configured to display the prompt message which indicates that the service is transmitted successfully after the transmitting unit completes the transmission of the high-priority service frame.

8. A device for receiving a high-priority service in direct mode, applied to a caller terminal, comprising:

a transmitting unit, configured to transmit a voice call;

a receiving and detecting unit, configured to receive and detect a priority frame in a first timeslot different from a second timeslot occupied by the voice call each time the transmitting unit transmits a voice frame, detect whether a level of the high-priority service indicated by a service level indicator in the priority frame is higher than a level of the voice call after the priority frame is detected;

a controlling unit, configured to in a case that the receiving and detecting unit detects that the level of the high-priority service indicated by the service level indicator is higher than the level of the voice call, notify the transmitting unit to stop the voice call and notify a receiving unit to receive the high-priority service frame in the first timeslot; and the receiving unit, configured to receive the high-priority service frame in the first timeslot;

wherein the priority frame and the high-priority service frame are generated by and transmitted in the first timeslot from a callee terminal, wherein the high-priority service is a service needing to be acknowledged by the caller terminal, and wherein the transmitting unit is further configured to transmit a response frame in the first timeslot to the callee terminal after the receiving unit completes the receiving of the high-priority service frame, to facilitate the callee terminal to display a prompt message which indicates that the service is transmitted successfully in a case that the response frame is received within the first timeslot by the callee terminal in a preset period since transmission of the high-priority service frame is completed by the callee terminal.

9. The device according to claim 8, wherein the device further comprises:

a display unit, configured to display, after the receiving unit completes the receiving of the high-priority service frame, the prompt message which indicates that the high-priority service is completed.

10. The device according to claim 9, wherein the high-priority service is a voice call service; or the high-priority service is a short message service;

the display unit is further configured to display a received short message after the receiving unit completes the receiving of the high-priority service frame.

* * * * *